United States Patent [19]

Mashino

[11] Patent Number: 4,680,530
[45] Date of Patent: Jul. 14, 1987

[54] VOLTAGE REGULATOR FOR GENERATOR USED IN AUTOMOBILE

[75] Inventor: Keiichi Mashino, Katsuta, Japan

[73] Assignee: Hitachi, Ltd., Tokyo, Japan

[21] Appl. No.: 824,087

[22] Filed: Jan. 30, 1986

[30] Foreign Application Priority Data

Feb. 1, 1985 [JP] Japan ................................. 60-16555
Feb. 20, 1985 [JP] Japan ................................. 60-30411

[51] Int. Cl.$^4$ ............................................. H02J 7/14
[52] U.S. Cl. ......................................... 322/33; 320/35; 320/64; 322/28
[58] Field of Search ............... 322/28, 33, 34; 320/35, 320/36, 64

[56] References Cited

U.S. PATENT DOCUMENTS

| | | | |
|---|---|---|---|
| 3,535,616 | 10/1970 | Rutherford et al. | 322/33 X |
| 3,600,661 | 8/1971 | Briggs et al. | 322/33 X |
| 3,602,796 | 8/1971 | Bleher | 322/33 X |
| 3,736,489 | 5/1973 | Mullersman | 320/35 |
| 4,220,908 | 9/1980 | Nicol | 322/33 |
| 4,385,270 | 5/1983 | Balan et al. | 322/33 X |
| 4,563,631 | 1/1986 | Mashino et al. | 322/33 |

Primary Examiner—R. J. Hickey
Attorney, Agent, or Firm—Antonelli, Terry & Wands

[57] ABSTRACT

In a generator charging a battery on an automobile with output voltage thereof, a voltage regulator has a constant voltage source; first and second voltage dividers dividing the voltage of the constant voltage source; a series circuit consisting of a thermo-sensitive element and a resistor and being connected to the middle point of the first voltage divider; a first diode having an anode connected to the middle point of the first divider; a second diode having an anode connected to the middle point of the second voltage divider; and a third diode having a cathode connected to both the cathodes of the first and the second diode and supplying a reference voltage, wherein the output voltage of the generator is compared with the reference voltage, thereby, the output voltage of the generator is regulated to the reference voltage.

9 Claims, 6 Drawing Figures

VOLTAGE REGULATOR FOR GENERATOR USED IN AUTOMOBILE

BACKGROUND OF THE INVENTION

The present invention relates to a voltage regulator of a generator, and more particularly to a voltage regulator suitable for a charge generator which charges a battery on an automobile.

As disclosed in Japanese Patent Laid-Open No. 55-37843(1980), for example, conventional voltage regulators of a generator effect voltage regulation in accordance with the temperature characteristics of a battery by means of the combination of a differential amplification circuit and a limiter circuit. However, since regulator of this kind uses two operational amplifiers, the number of devices is great, the chip area is great when the regulator is produced with a monolithic IC, and the cost of production becomes high.

And, as disclosed, for example, in U.S. Pat. No. 3,469,168, conventional voltage regulators include two systems of voltage detection circuits in order to prevent voltage control from failing if a voltage detection terminal of a battery, which is charged by a generator, comes off. However, since both systems are likely to have mutually different temperature characteristics, detection of an auxiliary voltage is effected preferentially at the time of normal generation, too, and the voltage of the battery can not be controlled accurately from time to time.

SUMMARY OF THE INVENTION

It is an object of the present invention to provide a voltage regulator which can effect voltage regulation in accordance with the temperature characteristics of a battery with fewer components than the prior art.

According to the present invention, calculating analogically a voltage point at which the voltage varies with temperature, and the minimum and maximum values of the voltage point providing a maximum value and a minimum value by use of a minimum value circuit and a maximum value circuit consisting of rectifiers. Particularly, other rectifiers, and the current flowing through these rectifiers is controlled to offset the imbalance of the voltage drops.

DETAILED DESCRIPTION OF PREFERRED EMBODIMENTS

Figure 1:
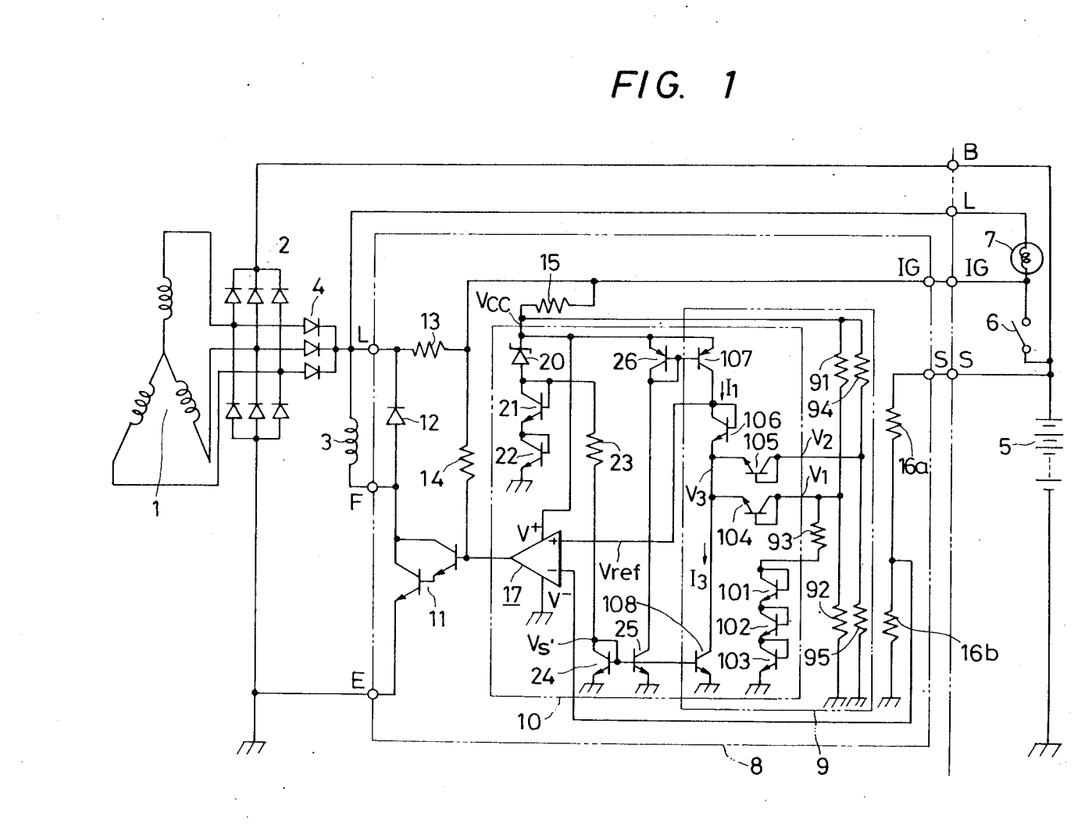
FIG. 1 is a circuit diagram of a charge generator in accordance with a first embodiment of the present invention.
Figure 2:
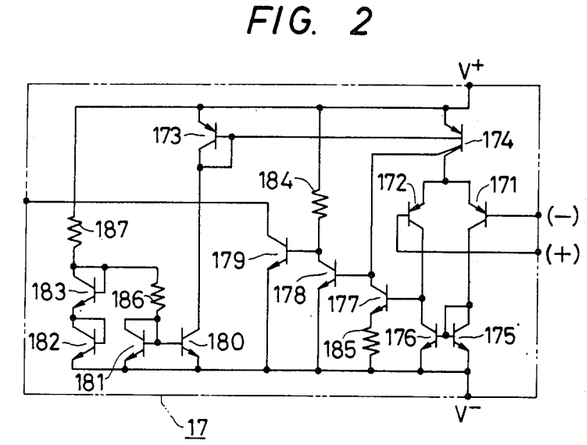
FIG. 2 is a circuit diagram showing in detail the comparison circuit in FIG. 1.

In FIG. 1, reference numeral 1 represents an armature winding of a generator; 2 is a three-phase full-wave rectifier; and 3 is a field winding. Reference numeral 4 represents an auxiliary rectifier; 5 is a battery; 6 is a key switch; and 7 is a charge pilot lamp. Reference numeral 8 represents a voltage regulator consisting of a hybrid IC; 9 is a reference voltage generating circuit; 10 is a monolithic IC fitted onto the hybrid IC; 11 is a power transistor; 12 is a flywheel diode; 13 is an initial excitation resistor; 14 and 15 are resistors; and 16a and 16b are voltage division resistors. Reference numeral 17 represents a comparison circuit. Its internal circuit consists of PNP transistors 171, 172, 173, multi-collector PNP transistors 174, NPN transistors 175 through 183, and resistors 184 through 187. Besides the reference voltage generator circuit 9 and the comparison circuit 17, the monolithic IC consists of a power source circuit composed of a zenor diode 20, transistors 21, 22, a resistor 23 and transistors 24, 25, 26. The reference voltage generating circuit 9 is constituted by thick film resistors 91, 92, 93, 94, 95 and transistors 101 through 108 on the monolithic IC.

Operation of the above circuitry will be given hereinafter. When the key switch 6 is turned on in the construction described above, the voltage of the battery 5 is applied to an IG terminal, the zenor diode 20 is excited and a power source voltage $V_{cc}$ of the monolithic IC is generated. Here, the transistors 21 and 22 function as diodes because their collectors and bases are short-circuited, respectively. The voltage of the battery 5 is applied to an S terminal, is divided by the voltage dividers 16a, 16b and is compared with a reference voltage $V_{ref}$ by the comparison circuit 17. When the generator is kept stopped, the voltage of the battery 5 is low so that the divided voltage $V_s'$ is lower than the reference voltage $V_{ref}'$ the output of the comparison circuit 17 is at a high level and the power transistor 11 becomes conductive. At this time a current flows from a parallel circuit consisting of the charge pilot lamp 7 and the initial excitation resistor 13 through the field winding 3, thereby effecting initial excitation. Then, the charge pilot lamp 7 is lit.

Next, when the generator begins to revolve, a voltage is generated on the armature winding 1, and an excitation current is supplied to the field winding 3 through the auxiliary rectifier 4, thereby entering the self-excitation state. Since the voltage at an L terminal becomes high at this time, the charge pilot lamp 7 is turned off. When the generated voltage of the generator further rises, the voltage of the battery 5 becomes higher. When the voltage $V_s'$ at the voltage division point reaches $V_{ref}'$ the output voltage of the comparison circuit 17 drops to a low level and the power transistor 11 is cut off. When the power transistor 11 is cut off, the current flowing through the field winding 3 is dampened through the flywheel diode 12, and the output voltage of the generator also drops in accordance with this current value. When the output voltage of the generator drops, the voltage of the battery 5 drops, too, and when $V_s'$ becomes lower than $V_{ref}'$ the output of the comparison circuit 17 changes to the high level, so that the power transistor 11 becomes conductive, the field current rises and the output voltage rises, too. These operations are repeated, and the voltage of the battery 5 is automatically regulated so that the voltage $V_s'$ at the voltage division point is equal to $V_{ref}$.

The regulated voltage of the battery 5 is determined as expressed by equation (3) from the following equations (1) and (2):

$$V_s' = \frac{R_b}{R_a + R_b} \cdot V_s \quad (1)$$

$$V_s' = V_{ref} \quad (2)$$

$$V_s = \left(1 + \frac{R_a}{R_b}\right) \cdot V_{ref} \quad (3)$$

where $R_a$: resistance of resistor 16a,
$R_b$: resistance of resistor 16b,
$V_s$: regulated voltage.

Next, the mode of change of the reference voltage $V_{ref}$ with temperature will be explained in more detail hereinafter.

Since the collector and base of each transistor 101-103 are short-circuited, the transistor functions as a diode. Its voltage value varies with temperature, and a voltage $V_1$ at the junction between resistors 91 and 92 also changes with the temperature. The voltage $V_2$ at the point between resistors 94 and 95 does not change unless $V_{cc}$ changes with temperature. The PN junction forward voltage of silicon diodes generally has a negative temperature gradient so that it is higher at a lower temperature. When the junction temperature of the transistors 101-103 is sufficiently low, the collector voltage of the transistor 101 does not exceed $V_1$ any longer, and substantially no current flows through the transistors 101-103. Therefore, the voltage $V_1$ does not change at a temperature lower than a certain temperature, and shows low temperature saturation characteristics.

Next, the transistors 104 and 105 also function as diodes. When $V_1$ is higher than $V_2$, the transistor 104 becomes conductive and when $V_2$ is higher than $V_1$, the transistor 105 becomes conductive. Therefore, $V_3$ can be expressed as follows:

$$V_3 = \max(V_1, V_2) - V_{BE} \quad (4)$$

where $V_{BE}$: base-emitter voltage of transistor.

Furthermore, the transistor 106 also functions as a diode and a constant current always flows through this diode. Therefore, $V_{ref}$ is higher by $V_{BE}$ than $V_3$, and can be expressed as follows:

$$V_{ref} = V_3 + V_{BE} = \max(V_1, V_2) \quad (5)$$

In other words, the transistor 106 operates so as to offset the voltage drop due to the transistor 104 or 105.

Since the collector voltage of the transistor 101 drops at high temperature, $V_1$ also drops with an increasing temperature. Here, if $V_2$ is set to be lower than $V_1$ at normal temperature, $V_{ref}$ does not become lower than $V_2$ even if $V_1$ drops at high temperatures. Therefore, $V_{ref}$ exhibits characteristics that go into saturation at low and high temperature ranges, as represented by dashed lines in FIG. 3.

The equation (5) is established when the voltage drop of the transistor 106 is equal to that of the transistor 104 or 105. However, the base-to-emitter voltage of transistors is generally expressed by the following equation:

$$V_{BE} \approx \frac{kT}{q} \ln \frac{I_c}{A_E \cdot I_o} \quad (6)$$

where:
k: Bolzmann's constant
T: absolute temperature
q: charge quantity
$I_c$: collector current
$A_E$: emitter area
$I_o$: leakage current.

If the same emitter area is secured inside the same IC chip and the same current is caused to flow, the influences of temperature can be neglected.

In the circuit shown in FIG. 1, the following equation can be established from Kirchhoff's law:

$$I_1 + I_2 = I_3 \quad (7)$$

where $I_1$: current flowing through transistor 106
$I_2$: current flowing through transistor 104 (at low and medium temperature) or transistor 105 (at high temperatures)
$I_3$: current flowing through transistor 108.

Under the condition that $$I_3 = 2I_1 \quad (8)$$

$$I_1 = I_2 \quad (9)$$

Therefore, the voltage drop of the transistor 106 is equal to that of the transistor 104 or 105, and the equation (5) can be established constantly. Here, the current value of the transistor 25 is equal to that of the transistor 26, and the current value of the transistor 26 is equal to that of the transistor 107 due to the current mirror effect. Therefore, the current value of the transistor 107 is equal to that of the transistor 106 provided that a current flowing into the comparison circuit 17 is neglected. Consequently, $I_1$ is equal to the value of the current flowing through the transistor 25. Since $V_{BE}$ of the transistor 25 is equal to that of the transistor 108, the current flowing through the transistor 108 becomes twice that of the transistor 25 and the equation (8) can be satisfied if the emitter area of the transistor 108 is set to be twice from the equation (6).

The temperature characteristics obtained from the circuit of the present invention can be quantitatively analyzed as follows. First of all, the resistance values are determined as listed below.

$R_1$: resistance of resistor 91
$R_2$: resistance of resistor 92
$R_3$: resistance of resistor 93
$R_4$: resistance of resistor 94
$R_5$: resistance of resistor 95

The saturation voltage $V_H$ at a low temperature is equal to the voltage obtained by dividing $V_{cc}$ by the resistors 91 and 92, and can be expressed as follows:

$$V_{ref}(\text{at low temperature}) = V_H = \frac{R_2}{R_1 + R_2} \cdot V_{cc} \quad (10)$$

On the other hand, the saturation voltage $V_L$ at a high temperature is equal to $V_2$, and can be expressed as follows:

$$V_{ref}(\text{at high temperature}) = V_L = \frac{R_5}{R_4 + R_5} \cdot V_{cc} \quad (11)$$

At normal temperature, $V_{ref}$ is equal to $V_1$ and can be expressed as follows:

$$V_{ref}(\text{at normal temperature}) = V_1 \qquad (12)$$

Here, since $$V_1 + R_1 \cdot \left( \frac{V_1 - 3V_{BE}}{R_3} + \frac{V_1}{R_2} \right) = V_{cc} \qquad (13)$$

$V_1$ is given as follows:

$$V_1 = \frac{V_{cc} + \frac{R_1}{R_3} \cdot 3 \cdot V_{BE}}{1 + \frac{R_1}{R_2} + \frac{R_1}{R_3}} \qquad (14)$$

The change quantity of $V_1$ with respect to the temperature change, that is, its temperature coefficient, can be obtained by calculating a partial differential from $V_1$ with T using $V_{BE}$ as a function of T, and can be expressed as follows:

$$\frac{\partial V_1}{\partial T} = \frac{\frac{R_1}{R_3}}{1 + \frac{R_1}{R_2} + \frac{R_1}{R_3}} \cdot 3 \cdot \frac{\partial V_{BE}}{\partial T} \qquad (15)$$

$\partial V_{BE}/\partial T$ can be calculated as follows by making partial differential of the equation (6) by T:

$$\frac{\partial V_{BE}}{\partial T} \approx \frac{k}{q} \ln \frac{I_c}{A_E \cdot I_0} \qquad (16)$$

Figure 3:
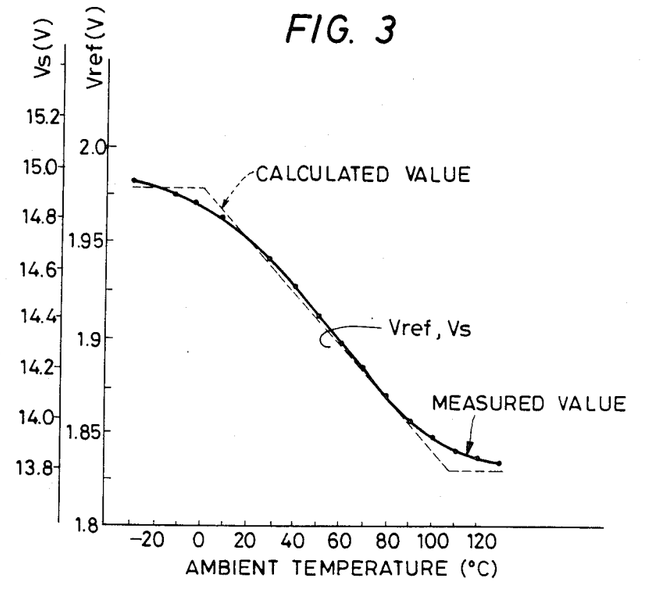
FIG. 3 is a temperature characteristics diagram of the circuit of FIG. 1.

Here, $V_{ref}$ and a practical regulated voltage have the proportional relationship as provided by the equation (3), and the result of calculation of the characteristics by providing a suitable circuit constants is indicated by dashed lines in FIG. 3. Here, the circuit constants are as follows:

| $R_a R_b$: 6.53, | $R_1$: 10 KΩ |
|---|---|
| $R_2$: 3.95 KΩ, | $R_3$: 3.7 KΩ |
| $R_4$: 10 KΩ, | $R_5$: 3.5 KΩ |
| $A_E$: 100 μm², | $I_0$: 3.64 × 10⁻¹⁶ A. |

The curve represented by solid line in FIG. 3 represents a measured values and its gradient is less linear in the vicinity of 0° C. and 100° C. than that of the calculated value. This results from the fact that $V_{BE}$ exhibits non-saturation characteristics when switching between low, medium and high temperatures, but does not present any practical problem. The regulator of the aforementioned Japanese Patent Laid-Open No. 55-37843 cited as an example of the prior art technique exhibits similar characteristics because it uses the forward characteristics of a transistor for the limiter circuit.

This embodiment can reduce the number of transistors, that constitute the reference voltage generation circuit having the temperature characteristics, 17 in the prior art, to only 8 in this device. Therefore, the chip area of the monolithic IC can be reduced and the cost of production can also be reduced. In conventional regulators, the number of terminals for connection with external resistors has been 4, this embodiment reduces that to 3. Here, the number of terminals corresponds to the number of bonding pads of the IC chip. Therefore, since the number of terminals is reduced, the number of bonding pads can be reduced so that the production steps can be simplified and the cost of production can be reduced. Since the maximum value circuit and the minimum value circuit are combined with each other, the function trimming of the thick film resistors can be made more easily.

Figure 4:
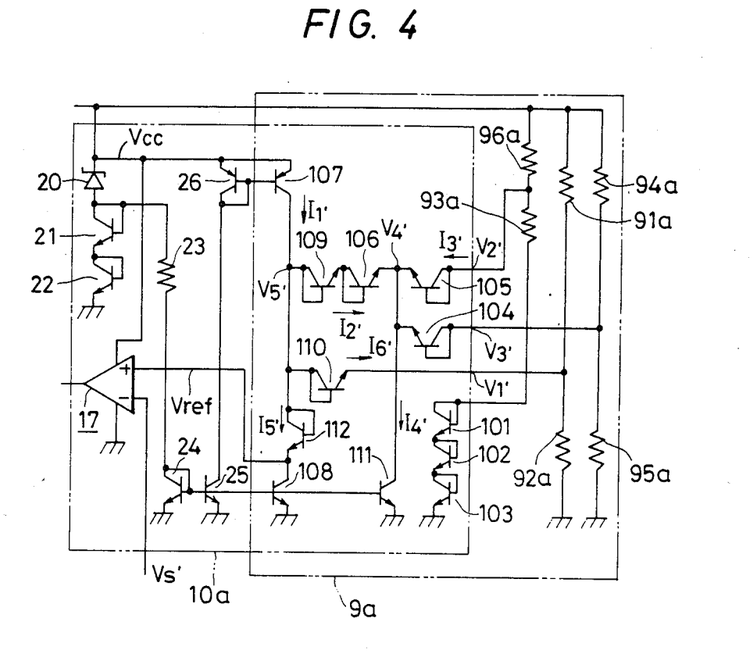
FIG. 4 is a circuit diagram of a reference voltage generation circuit in accordance with another embodiment of the present invention.

FIG. 4 shows another embodiment of the present invention. In FIG. 4, the portion of the reference voltage generating circuit 9 in FIG. 1 is improved and represented by an improved circuit 9a. In FIG. 4, reference numerals 91a, 92a, 94a and 95a are also voltage division resistors, respectively. Reference numerals 93a and 96a represent resistors, and reference numerals 109, 110, 111 and 112 represent NPN transistors. The other portions are the same as those in FIG. 1. In this construction, only the voltage $V_2'$ at the junction of the resistors 96a and 93a changes with the temperature, but $V_1'$ and $V_3'$ remain unchanged irrespective of temperatures.

In the same way as in the first embodiment, the voltage $V_4'$ at the junction of the transistors 104 and 105 can be expressed as follows:

$$V_4' = \max(V_2', V_3') - V_{BE} \qquad (17)$$

The voltage $V_5'$ at the junction of the transistors 109 and 110 can be expressed as follows because the lower voltage of the emitter voltages of the transistors 109 and 110 is transmitted:

$$V_5' = \min(V_4' + V_{BE}, V_1) + V_{BE} \qquad (18)$$

When the equation (17) is put into the equation (18), $$V_5' = \min[\max(V_2', V_3'), V_1'] + V_{BE} \qquad (19)$$

Therefore, $V_{ref}$ is given as follows by reducing the forward voltage drop $V_{BE}$ of the transistor 112 from $V_5'$:

$$V_{ref} = V_5' - V_{BE} \qquad (20)$$
$$= \min[\max(V_2', V_3'), V_1']$$

Figure 5:
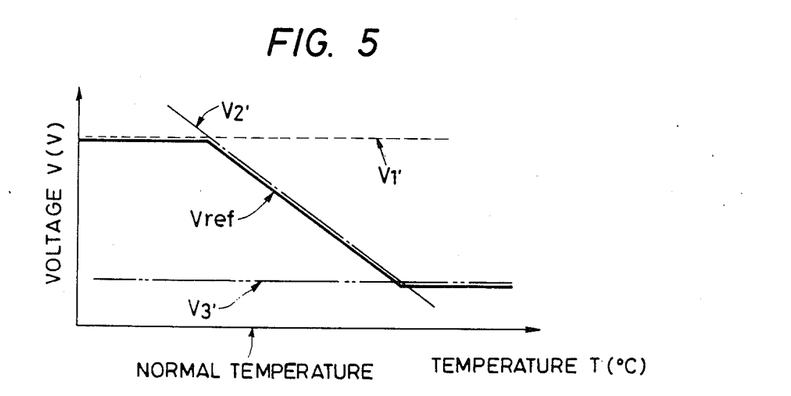
FIG. 5 is a diagram useful for explaining the operation of the circuit shown in FIG. 4.

The equation (20) will be explained with reference to FIG. 5. If $V_1'$ and $V_3'$ are set in such a manner to satisfy the relation $$V_3' < V_2' < V_1' \qquad (21)$$

at normal temperature, $V_{ref}$ by the equation (20) exhibits the characteristics represented by solid line in FIG. 5, and is equivalent to the first embodiment of the present invention.

Here, the equation (20) can be established only when the current flowing through each of the transistors is equal, in the same way as in the first embodiment. In FIG. 4, the current flowing through each transistor is as follows:

$I_1'$: curring flowing through transistor 107,
$I_2'$: current flowing through transistor 109,
$I_3'$: current flowing through transistor 104 (at high temperature) or transistor 105 (at low and medium temperature),
$I_4'$: current flowing through transistor 111,
$I_5'$: current flowing through transistor 112,
$I_6'$: current flowing through transistor 110.

Then, the following equations can be established from the Kirchhoff's law:

$$\begin{cases} I_1' = I_2' + I_6' + I_5' & (22) \\ I_2' + I_3' = I_4' & (23) \end{cases}$$

At this time, if the following conditions $$\begin{cases} I_5' = \tfrac{1}{3} I_1' & (24) \\ I_4' = I_1' & (25) \end{cases}$$

are assumed, the following equations can be obtained:

$$I_2' = I_3' = \tfrac{1}{2} I_1' \quad (26)$$

$$I_5' = I_6' = \tfrac{1}{3} I_1' \text{ (only at low temperature)} \quad (27).$$

It is thus confirmed that equation (20) can be satisfied.

Though the number of elements is greater than that of the first embodiment, this embodiment can set $V_1'$ and $V_3'$ by adjusting the ratio of the voltage division resistors, and can set the temperature gradient independently of $V_1'$ and $V_3'$ by means of the resistors 93a and 96a. Therefore, function trimming of the thick film resistors can be made more easily.

Figure 6:
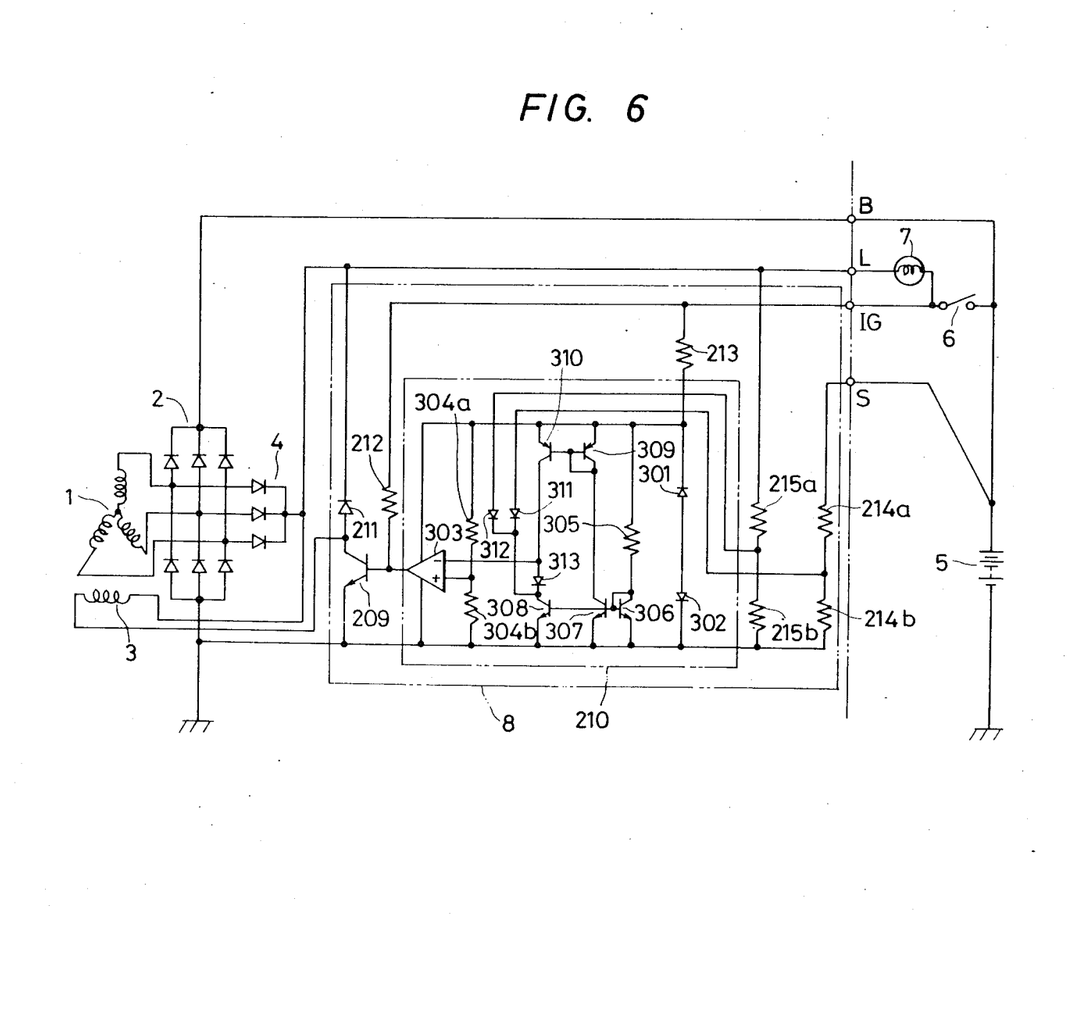
FIG. 6 is a circuit diagram of a charge generator in accordance with further another embodiment of the present invention.

Hereinafter, a further another embodiment of the present invention will be described with reference to FIG. 6 of the accompanying drawings. FIG. 6 is a circuit diagram of a charge system including a generator which is driven by an engine (not shown).

In the drawing, reference numeral 1 represents an armature winding of a generator; 3 is a field winding which supplies a magnetic flux to the armature winding 1; 2 is a three-phase full-wave rectifier for converting the a.c. output of the armature winding 1 to a d.c.; 4 is an auxiliary rectifier 4; and 5 is a battery which is connected to and charged by the three-phase full-wave rectifier 2 and supplies a current to an external load (not shown). Reference numeral 6 represents a key switch, and 7 a charge pilot lamp. Reference numeral 8 represents a voltage regulator which is formed by a hybrid thick film integrated circuit and consists of a power transistor 209, a monolithic IC 210 for control, a flywheel diode 211, resistors 212, 213 and voltage division registers 214a, 214b, 215a, 215b.

The control monolithic IC 210 consists of a zener diode 301, a constant voltage circuit formed by a diode 302, a comparator 303, voltage division resistors 304a, 304b, a resistor 305 for generating a constant current, NPN transistors 306, 307, 308, PNP transistors 309, 310 and diodes 311, 312, 313.

When the key switch 206 is turned on the construction described above, an initial excitation current flows from the battery 5 through the field winding 3 and the power transistor. Next, when the generator starts revolution, a voltage is generated on the armature winding 1 and the battery 5 is charged through the three-phase full-wave rectifier 2.

When the key switch 6 is turned on, a constant voltage is generated in the constant voltage circuit in the control monolithic IC 210, and the comparator 303 is driven. When the generated voltage is low and at the same time, when the voltage of the battery 5 is low, the voltage at the voltage division point of the voltage division resistrors 214a and 214b for dividing the voltage of the battery 5 is lower than that of the voltage division resistors 304a and 304b for dividing the constant voltage, so that the output of the comparator 303 is at a high level, the power transistor 209 becomes conductive and the field current is energized. The generated voltage rises with the increase in the field current and the voltage of the battery 5 becomes higher. Then, the voltage at the voltage division point of the voltage division resistors 214a, 214b is higher than the voltage at the voltage division point of the voltage division resistors 304a, 304b, so that the output of the comparator 103 is at a low level, the power transistor 209 is cut off and the field current attenuate through the flywheel diode 211. When the field current decreases, the output voltages of the generator and the battery 5 also decreases. These operations are repeated and the voltage of the battery 5 is controlled to a predetermined value.

Here, let us assume that the voltage at the voltage division point of the voltage division resistors 214a, 214b and that of the voltage division point of the voltage division resistors 215a, 215b are $V_S'$ and $V_B'$, respectively. The collector potential $V_1$ of the transistor 308 can then be expressed as follows:

$$V_1 = \max(V_S', V_B') - V_{BE} \quad (28)$$

where $V_{BE}$ is a base-emitter voltage of the transistor or a forward voltage drop of a diode.

The ratio of the voltage division resistors is selected in such a manner as to satisfy the relation $V_S' > V_B'$, so that the equation (28) can be expressed as follows:

$$V_1 = V_S' - V_{BE} \quad (28')$$

Furthermore, the anode potential $V_2$ of the diode 113 can be expressed as follows:

$$V_2 = V_1 + V_{BE} \quad (29)$$

The following equation can be given by putting the equation (28) into the equation (29):

$$V_2 = \max(V_S', V_B') \quad (30)$$

When the equation (28') can be established, the equation (30) is re-written as follows:

$$V_2 = V_S' \quad (30')$$

Therefore, the voltage at the S terminal is controlled to a predetermined value.

Next, when the Sterminal comes off, $V_S'$ becomes a ground potential and $V_B' > V_S'$. Therefore, the equation (30) becomes as follows:

$$V_2 = V_B' \quad (30'')$$

Consequently, the voltage at the B terminal is controlled to a predetermined value. In this manner, this embodiment effects the detection of the auxiliary voltage for the voltage of the generator even if the voltage detection terminals come off, and the generator voltage is controlled to a predetermined value.

In order to satisfy the condition that the equation (30) can be established and $V_{BE}$ of the equations (28) and (29) can be completely offset, the current flowing through the diode 311 or 312 must be equal to the current flowing through the diode 313.

Generally, the base-emitter voltage of a transistor can be expressed as follows:

$$V_{BE} \approx \frac{kT}{q} \cdot \ln \cdot \frac{I_c}{A_E \cdot I_o} \quad (31)$$

where
- k: Boltzmann's constant
- T: absolute temperature
- q: charge quantity
- $I_c$: collector current
- $A_E$: emitter area
- $I_o$: leakage current.

Here, the diodes 311, 312 and 313 are obtained by short-circuiting the collector and base of the transistors.

In connection with the equation (31), $A_E$ and $I_o$ of devices in the same monolithic IC are equal, so that $V_{BE}$ is primarily determined by $I_c$. In the circuit shown in FIG. 6, the transistors 310 and 308 function as a constant current source by means of a current mirror circuit, and the following equation (32) is given:

$$I_1 + I_3 = I_2 \quad (32)$$

where
- $I_1$: collector current of transistor 310 ($\approx$ current of diode 313)
- $I_2$: collector current of transistor 308
- $I_3$: current of diode 311 or 312 (current of diode 311 when S terminal is connected).

Here, if the condition $I_2 = 2I_1$ is added, the equation (32) can be rewritten as follows:

$$I_1 = I_3 \quad (33)$$

It is evidenced from the equation (33) that the current value flowing through the diode 311 or 312 is equal to that of the diode 313, $V_{BE}$ of the equations (28) and (29) can be offset and the equation (30) can be established.

The transistor 306 causes a reference constant current, which is determined by the resistor 305, to flow from the constant voltage circuit, and this current will be called "$I_1$". Assuming that the transistor 307 has the same emitter area as that of the transistor 306, then a current equal to $I_1$ flows. This current drives the transistor 309, and the same current, that is, $I_1$, flows also through the transistor 310 that is connected in the current mirror arrangement. On the other hand, if the emitter area of the transistor 308 is set to be twice that of the transistor 306, the current flowing through the transistor 308 becomes twice that of the transistor 306 if the left side of the equation (31) is regarded as a predetermined value. In this manner, the condition of $I_2 = 2I_1$ can be satisfied. Therefore, the higher voltage of $V_S'$ and $V_B'$ is always transmitted to the comparator 303 irrespective of temperatures or the like, and this voltage determines the output voltage of the generator.

In accordance with this embodiment, the voltage of the battery 5 can be detected accurately irrespective of temperature and the like. Therefore, the battery charging performance can be improved.

Apparently from the above, according to the present invention, it is possible to accomplish a voltage regulator for power generation control with a reduced number of elements.

What is claimed is:

1. In a voltage regulator of a generator for an automobile, said voltage regulator having a comparator for comparing an output voltage of the generator with a reference voltage and including means for regulating the output voltage of the generator, a reference voltage generating means comprising:
   a constant voltage source for generating a constant voltage, said constant voltage source having a positive pole and a negative pole;
   first and second voltage dividers connected across said constant voltage source for dividing the voltage of said constant voltage source;
   a series circuit comprised of a thermo-sensitive element and a resistor that are connected between a voltage division point of said first voltage divider and said negative pole of said constant voltage source;
   a first diode having an anode thereof connected to a voltage division point of said first voltage divider and having a cathode;
   a second diode having an anode thereof connected to a voltage division point of said second voltage divider and a cathode thereof connected to the cathode of said first diode; and
   a third diode having a cathode thereof connected to the cathode of said first and second diodes, and providing said reference voltage at an anode thereof.

2. A voltage regulator of a generator according to claim 1, which further includes a first constant current source circuit connected between the anode of said third diode and the positive pole of said constant voltage source, and a second constant current source circuit connected between the cathode of said first diode and the negative pole of said constant voltage source.

3. In a voltage regulator of a generator for an automobile, said voltage regulator having a comparator for comparing an output voltage of the generator with a reference voltage and including means for regulating the output voltage of the generator, a reference voltage generating means comprising:
   a constant voltage source for generating a constant voltage, said constant voltage source having a positive pole and a negative pole;
   first and second voltage dividers connected across said constant voltage source for dividing the voltage of said constant voltage source;
   a series circuit comprised of a plurality of resistors and one or more thermo-sensitive elements and connected to said constant voltage source;
   a first diode having an anode thereof connected to one point in said series circuit;
   a second diode having an anode thereof connected to a voltage division point of said second voltage divider, and having a cathode thereof connected to the cathode of said first diode;
   a third diode having a cathode thereof connected to the cathode of said first diode;
   a fourth diode having a cathode thereof connected to the anode of said third diode;
   a fifth diode having an anode thereof connected to the anode of said fourth diode; and
   a sixth diode having an anode thereof connected to the anode of said fifth diode, and providing said reference voltage at a cathode thereof.

4. A voltage regulator of a generator according to claim 3, which further includes a first constant current source connected between the anode of said fourth diode and said constant voltage source, a second constant current source connected between the cathode of said first diode and the negative pole of said current voltage source, and a third constant current source connected between the cathode of said sixth diode and the negative pole of said constant voltage source.

5. A voltage regulator of a generator according to claim 4, wherein the current value of said second constant current source is set to be about twice that of said first constant current source.

6. A voltage regulator of a generator according to claim 5, wherein the current value of said first constant current source is substantially equal to that of said second constant current source, and the current value of said third constant current source is half that of said first constant current source.

7. A voltage regulator of a generator for an automobile, comprising:
   a constant voltage source for generating a constant voltage;
   a reference voltage generator for generating a reference voltage;
   first and second voltage dividers for dividing the voltage of said output voltage of the automobile generator;
   a first diode having a cathode thereof connected to a voltage division point of said first voltage divider;
   a second diode having a cathode thereof connected to a voltage division point of said second voltage divider;
   a third diode having a cathode thereof connected to both cathodes of said first and second diodes and providing an output voltage at its anode; and
   a comparator for comparing the output voltage of said third diode with said reference voltage of said reference voltage generator, and for regulating the output of the automobile generator in accordance with said comparison.

8. A voltage regulator according to claim 7, which further includes a first constant current source connected to the anode of said second diode and a second constant current source connected to the cathode of said second diode.

9. A voltage regulator according to claim 8, wherein the current value of said second constant current source is set to be substantially double that of said first constant current source.

* * * * *